United States Patent [19]

Secrest

[11] 4,329,815
[45] May 18, 1982

[54] SELF CONTROLLED WATERING PLANTER DEVICE

[75] Inventor: Allen D. Secrest, Atherton, Calif.

[73] Assignee: Planter Technology Investments Limited, Mountain View, Calif.

[21] Appl. No.: 204,866

[22] Filed: Nov. 7, 1980

[51] Int. Cl.³ ............................................. A01G 27/00
[52] U.S. Cl. ........................................................ 47/80
[58] Field of Search ................................. 47/66, 79–81

[56] References Cited

U.S. PATENT DOCUMENTS

| | | | |
|---|---|---|---|
| 3,043,053 | 7/1962 | Peters | 47/80 |
| 3,758,987 | 9/1973 | Crane | 47/80 |
| 3,775,904 | 12/1973 | Peters | 47/80 |
| 3,783,555 | 1/1974 | Peters | 47/79 |
| 4,001,967 | 1/1977 | Smith et al. | 47/80 |

FOREIGN PATENT DOCUMENTS

| | | | |
|---|---|---|---|
| 605947 | 8/1931 | Fed. Rep. of Germany | 47/80 |
| 1287848 | 1/1969 | Fed. Rep. of Germany | 47/80 |
| 2717527 | 11/1978 | Fed. Rep. of Germany | 47/81 |
| 815709 | 7/1937 | France | 47/80 |
| 136434 | 12/1919 | United Kingdom | 47/66 |

Primary Examiner—James R. Feyrer
Attorney, Agent, or Firm—Thomas E. Schatzel

[57] ABSTRACT

An improved self controlled watering planter device of the type utilizing a porous moisture sensor, an air-tight fluid reservoir and a membranous fluid inlet port on the interior bottom of the device including concentric annular ridges and a solid circular disk for inhibiting the interference of plant roots with the fluid inlet port. The improved device further includes baffle structures to inhibit debris from fouling the bottom portion of the inlet port, an interiorally mounted moisture sensing unit and an inward draining niche surrounding the fluid reservoir fill port.

6 Claims, 3 Drawing Figures

U.S. Patent  May 18, 1982  4,329,815
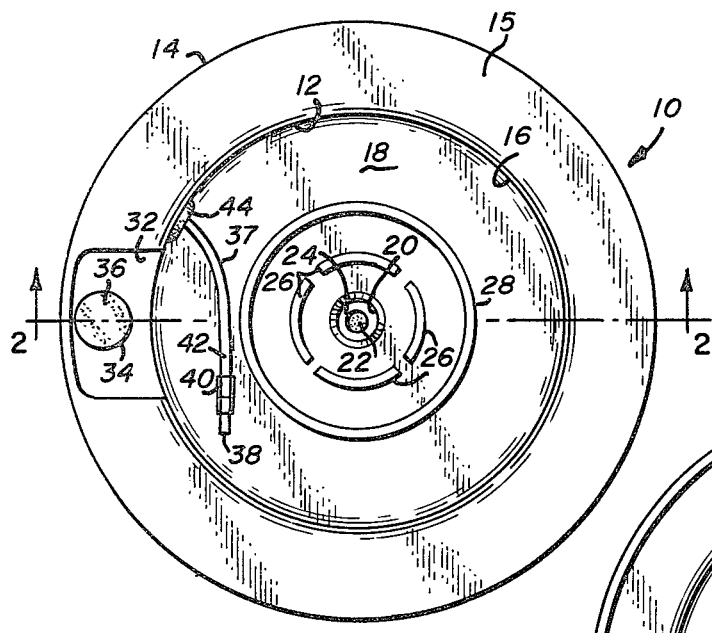
Fig_1
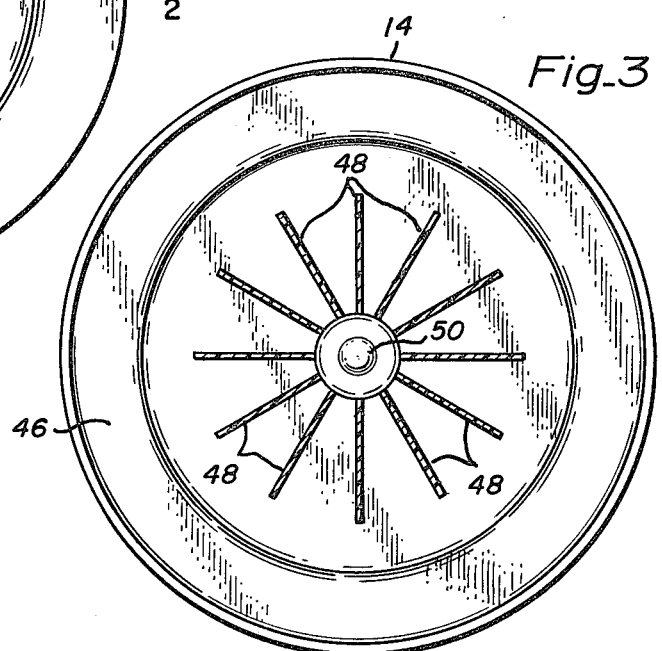
Fig_3
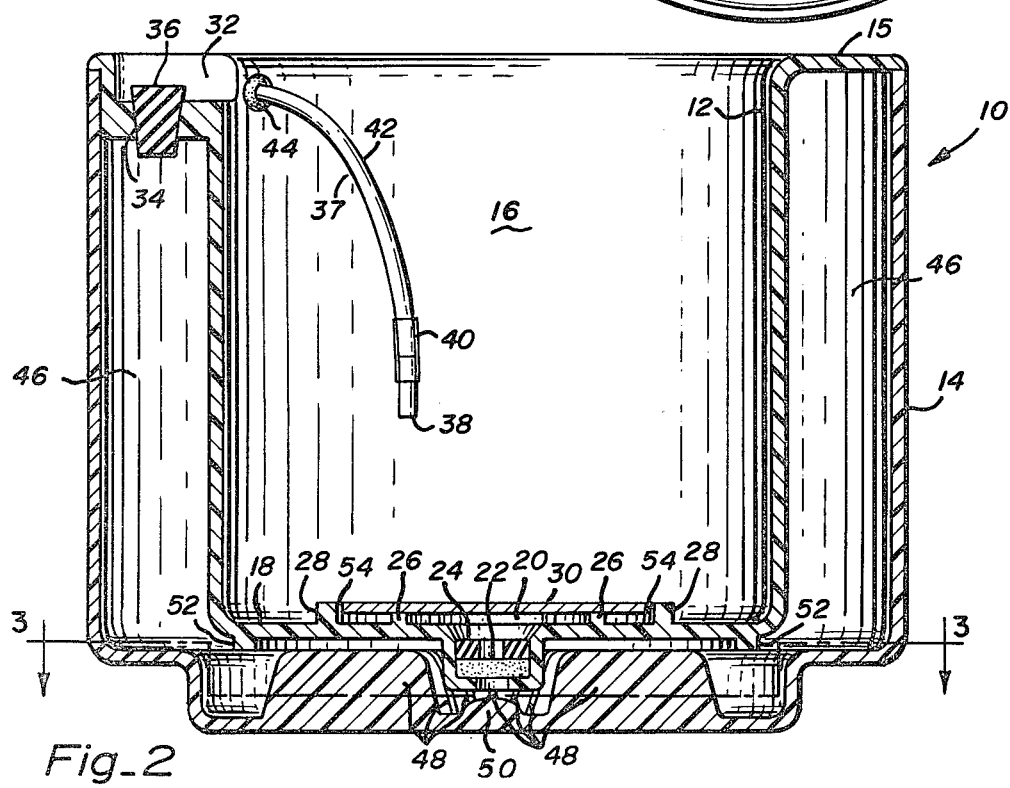
Fig_2

SELF CONTROLLED WATERING PLANTER DEVICE

BACKGROUND OF THE INVENTION

1. Field of the Invention

The present invention relates generally to containers for living plants and more specifically to self controlled watering planter devices.

2. Description of the Prior Art

The urban and suburban nature of modern living has led to a proliferation in the use of potted plants as decorative items. Living potted plants are commonly found in private homes, restaurants, hotels, office buildings and many other locations. Consequently, devices for containing and caring for potted plants have become a major commodity.

One of the most desirable types of potted plant devices available is the self watering planter. Self watering planters are devices containing relatively large water or fluid reservoirs which may be periodically filled and which then dispense the water to the plant as the plant requires it. Self watering planters have been devised to operate by way of timer systems or by way of constant low volume seepage into the soil surrounding the plant. One of the most effective self watering planters, however, is the type wherein a sensor is placed within the soil of the plant to sense the level of moisture in the soil and cause additional water to be delivered to the soil if the moisture level is too low. Sensing self watering planters of this type have utilized electrical sensing units, an expensive and possibly dangerous solution, and porous hydrophilic (water loving) sensors.

Porous hyrophilic sensing devices allow air to pass through the porous material when it is dry but prohibit the passage of air when the porous material is wet. The porous sensor is connected to an air-tight water reservoir such that when the sensor is blocked by water, atmospheric pressure cannot reach the water reservoir and vacuum pressure prevents the delivery of water to the soil of the plant.

A self watering planter using a porous hydrophilic sensor is described in U.S. Pat. No. 3,758,987 issued to W. Crane, Jr. The Crane patent discloses a self watering planter having the inlet port to the soil located at the center of the bottom interior of the planter. In a device of this construction, the water enters the soil from the bottom while the sensor measures the moisture content of the soil near the top. When the moisture level at the sensor element is sufficiently high to block the pores such that air may no longer flow through the sensor element, the water flow into the soil is stopped.

One of the major difficulties which may be encountered in a self watering planter of the porous sensor variety is that the roots of the plant are hydrotropic, that is they tend to grow towards the source of water. Frequently the plant roots will grow down through the soil to the inlet port of the planter and foul or clog the port such that it does not operate properly.

Another disadvantage of prior art self watering planters is that the tube connecting the sensor element to the water reservoir frequently extends above the level of the planter and is in plain view. This not only mars the beauty of the plant but in public areas, such as restaurants and hotel lobbies, frequently leads to the sensor being displaced or broken by passers-by or curious individuals.

SUMMARY OF THE INVENTION

Accordingly, it is an object of the present invention to provide an improved self controlled watering planter where the water inlet to the soil is not readily subject to clogging or fouling by the plant roots.

It is another object of the present invention to provide an improved self controlled watering planter which is aesthetically pleasing and relatively resistant to functional disruption.

Briefly, a preferred embodiment of the present invention is an improved self controlled watering planter device of the type utilizing a porous upper sensor, an air-tight water reservoir, and an inlet port to the soil located at the bottom interior surface of the planter. The improved planter includes a broken annular ridge arrayed concentrically about the inlet port, a solid annular ridge of the greater diameter than the broken ridge and also situated concentrically about the port, a thin circular disk for resting upon the top surface of the broken ridge such that the edge of the disk and the interior edge of the solid annular ridge form a narrow annular aperture of water for delivery of water from the inlet port to the soil and the plant. The improved planter also includes a moisture sensing element being connected to the water reservoir at a point inside the planter such that it is not obviously visible from the outside. The water reservoir is provided with baffles in the area of the inlet port to prevent debris in the water reservoir from clogging the inlet port and reducing the efficiency of the device. The fluid fill port of the fluid reservoir is situated in a niche in the interior wall, the niche draining to the interior of the planter rather than the exterior.

It is an advantage of the present invention that the annular ridges and circular disk substantially inhibit the growth of plant roots in the vicinity of the inlet port such that the port is much less likely to be fouled by the roots.

Another advantage of the present invention is that the water is delivered to the soil throughout the entire annular aperture, thus providing a wider initial moisture distribution within the planter.

It is a further advantage of the present invention that the entire mechanism is situated within the volume of the planter device such that it is not readily visible or accessible to casual observers.

It is yet another advantage of the present invention that the fluid reservoir is provided with baffles in the vicinity of the inlet port such that debris is inhibited from fouling the inlet port operation.

It is a further advantage of the present invention that any overflow occurring when the water reservoir is filled drains into the planter and not out of the device onto furniture or flooring.

These and other objects and advantages of the present invention will become apparent to one skilled in the art upon reading the following detailed description of the preferred embodiment which is illustrated in the several figures of the drawing.

IN THE DRAWING

FIG. 1 is a top plan view of an improved self controlled watering device of the present invention, shown in an empty state with the circular disk element removed;

FIG. 2 is a cross-sectional view taken along line 2—2 of FIG. 1, with the circular disk element in place; and FIG. 3 is a cross-sectional view taken along line 3—3 illustrating the internal baffle structure.

DETAILED DESCRIPTION OF THE PREFERRED EMBODIMENT

The present invention is an improved version of a self controlled watering planter device. This device is used for potted plants. A self controlled watering planter is particularly valuable for circumstances where it is inconvenient to provide direct watering of the plants on a regular basis.

Referring now to FIG. 1, a preferred embodiment of the improved self controlled watering device is shown in a top plan view and designated by the general reference character 10. The self controlled watering planter device 10 is constructed of an inner circular structure 12 and an outer circular structure 14 (illustrated in FIGS. 2 and 3). The inner structure 12 has a rim 15 welded to the outer structure 14 to form a composite structure. As illustrated in FIG. 1, the inner structure 12 forms an inner bowl 16 in which the soil and plant are actually contained. The bowl portion 16 has substantially vertical sides and a substantially flat horizontal bottom wall 18. Situated in approximately the center of the bottom wall 18 and bowl 16 is a fluid inlet port 20 through which liquid enters the bowl 16. The inlet port 20 is a cylindrical depression which contains an inlet filter element 22 which is partially occluded and held in position by a washer 24. Inlet filter 22 is a hydrophobic (water hating) porous element which acts as a membrane to allow the passage of liquid when pressure is applied but inhibits the capillary flow of liquid therethrough. Washer 24 is a flexible material such as rubber which fits firmly within the sides of the inlet port 20 to hold the inlet filter 22 firmly in position. The washer 24 is donut shaped such that a substantial portion of the inlet filter 22 is open to the bowl 16.

Concentric about the inlet port 20 is a broken annular ridge 26. Broken annular ridge 26 is a ridge raised above the bottom wall 18 having a number of breaks (passages) therein to allow the free flow of liquid through the breaks. Concentrically situated beyond broken annular ridge 26 is a solid annular ridge 28. Solid ridge 28 is a continuous ring formed on the bottom surface 18. Solid ridge 28 has a greater depth than that of broken ridge 26.

A portion of rim 15 is cut away to form a niche 32. Niche 32 is formed to be open towards the interior of bowl 16 and closed towards the outside of the planter device 10. Situated within the niche 32 is a fluid fill port 34 through which water or other liquid is introduced into the planter device 10. When the device 10 is in operation the fluid fill port 34 is sealed in an air-tight manner by a stopper 36.

Extending into the bowl 16 from the sidewall portion 12, at a point above the level of the bottom of fluid fill port 34 is a moisture sensor unit 37. The moisture sensor unit 37 includes a porous sensor element 38 which is secured by a bonding sleeve 40 to an air tube 42. The air tube 42 is then connected through the wall 12 of bowl 16 at an interference fit 44 to the fluid reservoir located within the planter device 10. The sensor element 38 is a hydrophilic porous member which is permeable to air flow when dry but impermeable to air flow when saturated with moisture. The degree of porosity of the sensor element 38 determines the amount of moisture necessary to saturate the sensor element 38 such that it becomes impermeable to air flow. When air flows through sensor 38 it continues through air tube 42 and air tube port 44 into the fluid reservoir which occupies the space between the inner structure 12 and the outer structure 14. The atmospheric pressure delivered to the upper portion of the fluid reservoir causes the fluid to be forced through inlet filter 22 and into the interior of bowl 16.

Referring now to FIG. 2, a cross-section of the planter device 10 is illustrated as taken along lines 2—2 of FIG. 1. This figure illustrates the manner in which the inner structure 12 and the outer structure 14 are formed together and also illustrates the interior structure of the device in the vicinity surrounding port 20.

The lip 15 of the interior structure 12 and the exterior wall structure 14 are bonded around their intersecting edges to form an air-tight seal and to create a fluid reservoir 46 in the volume between the walls 12 and 14. The fluid reservoir 46 is filled with fluid added through fluid fill port 34 which is located in the niche 32 of rim 15. Situated at the bottom of the fluid reservoir 46, in the vicinity surrounding inlet port 20 are a number of structures to baffle the flow of fluid and debris through the reservoir 46. The baffle structures serve to protect the inlet filter 22 from fouling caused by debris.

In the preferred embodiment illustrated, the baffle structures include a number of radial baffle fins 48 extending outward from the center of the bottom portion of the outer structure 14. Situated directly at the center of the bottom of outer structure 14 and directly under the inlet port 20 is a nipple element 50. The baffle fins 48 limit the flow of fluid within the fluid reservoir 46 so as to minimize any turbulence which might stir-up debris which has gotten into the reservoir 46. The nipple 50 is sloped such that any debris which enters the inlet port 20 and is gravitationally pulled downward will slide down the sloping sides of nipple 50 and out of contact with the inlet filter 22.

A further element for protecting the input filter 22 from fouling is a floating debris guard ridge 52 molded on the bottom exterior surface of inner structure member 12. Floating debris guard ridge 52 is a solid annular ring which restricts any debris floating within the fluid reservoir 46 from reaching the inlet port 20.

In the device 10, it may be noted that the inlet filter 22 and washer 24 are recessed downward from the bottom surface 18 of bowl 16 in inlet port 20. Situated directly above the inlet port 20 is the thin circular disk 30 which rests upon broken annular ridge 26. The thickness of disk 30 combined with the depth of broken annular ridge 26 is approximately equal to the depth of solid annular ridge 28. Thus, the upper surface of disk 30 is level with the upper surface of solid ridge 28. The exterior edge of disk 30 extends almost to the interior edge of solid ridge 28 to form therebetween an annular fluid aperture 54. Annular fluid aperture 54 provides the route by which water or other fluid is delivered to the interior of bowl 16 and consequently to the plant.

Referring again to FIG. 3, the interior of the outer structure element 14 is illustrated. In this view it may be seen that the baffle fins 48 are arranged radially about the nipple 50 on the bottom interior surface of the outer structure element 14. When it is desired to utilize the improved self controlled watering planter device 10 the circular disk 30 is carefully centered upon the broken annular ridge 26 and the bowl 16 is then filled with potting soil. A plant is then planted in the potting soil. After the plant has been planted, the fluid reservoir 46 is filled with water or whatever fluid is to be delivered to the plant. Sensor element 38 is then placed in the potting soil at varying depth depending upon the optimum degree of moisture saturation within the potting soil to provide the best growth conditions for the particular plant.

When the moisture level in the potting soil is sufficient that the pores of sensor 38 are occluded, no air may pass through sensor 38 and air tube 42 to the top volume of reservoir 46. Under these circumstances the pressure differential within reservoir 46 prevents the flow of fluid through porous inlet filter 26 and into the bowl 16. Porous inlet filter 26 is a hydrophobic material, such as untreated polyethylene, which inhibits the capillary transmission of fluid. When the soil and sensor element 38 dry out sufficiently to permit the passage of air through the sensor element 38 the upper portion of reservoir 46 is thus delivered atmospheric pressure which forces fluid through inlet filter 22, through the breaks in broken annular ridge 26 and through the annular aperture 54 to the soil and the plant. The moisture will then be carried through the soil until the level is sufficient that the pores of sensor 38 are again occluded and the flow is again stopped by vacuum action.

Since plant roots are hydrotropic (water seeking) they will typically grow towards the water source. In self controlled watering planters where no protection is provided to the inlet port vicinity 20, the roots of the plants tend to ultimately clog and choke the inlet port 20 and foul the planter operation. This can prevent the needed fluid and nutrition from reaching the plant. The plant is harmed by such deprivation. The interaction of the broken annular ridge 26, the solid annular ridge 28 and the disk 30 acts to inhibit the growth of the plant roots towards the inlet port 20. The immediate water source for the plant is the annular aperture 54. Consequently, the roots are drawn outward to the vicinity of annular aperture 54 rather than inward to a tight vicinity such as an uprotected inlet port 20. In this manner, the roots are much less congregated and are less likely to block the flow of water in any way. The narrowness of annular aperture 54 and the solidity of solid ring 28 and disk 30 substantially inhibit any root growth from reaching the near vicinity of inlet port 20 and clogging it. The disk 30 also protects the inlet port 20 from being clogged by tightly packed soil. Ordinarily, soil is not a problem due to its permeability to water but if it is tightly packed by too much pressure, it can create a barrier. The use of disk 30 prevents the occurrence of such a tightly packed barrier which may occur during the filling of the planter 10 with potting soil.

Inlet port 20 is subject to blockage from below as well as above. It is not infrequent that debris reaches the interior of the fluid reservoir 46. In situations where the fluid reservoir 46 has a totally smooth interior, currents may be set up which cause the debris to congregate in the vicinity of the inlet port 20 which is of course the outlet port from the fluid reservoir 46. Debris can then accummulate on the bottom surface of inlet filter 26 and occlude the pores. This occlusion can substantially reduce the fluid flow through inlet filter 26 and subsequently to the plant and have a harmful effect upon the plant. The combined action of baffle fins 48, nipple 50 and floating debris guard ridge 52 substantially reduce the amount of debris which is carried to the inlet filter 26. This consequently extends the lifetime of the inlet filter 26 and increases the period between cleanings of the mechanisms of the planter device 10.

It is to be noted that air tube port 44, while situated on the interior wall of bowl 16 to prevent high visibility and easy access from the exterior of the planter device 10, is situated at a point on that wall above the level of fluid fill port 34. This is necessary to prevent back flow of liquid through air tube 42 to sensor element 38. Back flow could saturate sensor element 38 and prevent the proper functioning of the self controlled watering planter device 10.

The preferred embodiment of the present invention is molded in two major elements out of high strength plastic and then welded together. The circular disk is separately molded and is also a plastic element. Sensor element 38 is a polyethylene treated chemically such that it is hydrophilic, and having an average pore size of approximately twenty microns. Insert filter 26 is also polyethylene, however this polyethylene is not treated so it is in its natural hydrophobic state. The average pore size in the preferred inlet filter 26 is approximately thirty-five microns. Washer 28 is a standard rubber washer. Air tube 42 is ordinary tubing of any relatively flexible yet difficult to collapse design. The bonding sleeve 40 which holds the sensor element 38 on the air tube 42 may be heat shrink tubing. Stopper 36 is an ordinary chemical rubber stopper.

The improved self controlled watering planter device of the present invention may be constructed to any given dimensions. The precise shape is not particularly important. The pore sizes of the sensor element and the filter element may be varied to fit the individual needs of a given plant. The relative diameters of the inlet port 20, the broken annular ring 26 and the solid annular ring 28 may be adjusted to fit the particular needs of the user.

Although the invention has been described in terms of the presently preferred embodiment, it is to be understood that various alterations and modifications may be made in the structure without altering the invention. Accordingly, it is intended that the following claims be interpreted as including all structures within the true spirit and scope of the invention.

I claim:

1. In a self controlled watering planter device including a porous moisture sensor for placing within the soil, an air-tight sealable fluid reservoir and a fluid inlet port located on the interior bottom of the planter device, the improvement comprising:

a broken annular ridge, situated concentrically about the fluid inlet port, a thin circular disk having a diameter greater than the broken annular ridge for resting on top of the broken annular ridge to protect the fluid inlet port from plant root incursion while permitting fluid flow through the breaks in the broken annular ridge; and a solid annular ridge situated concentrically about the broken annular ridge, the interior diameter of the solid annular ridge being slightly greater than the diameter of the thin circular disk and—the depth of the solid ridge—being—approximately equal to the thickness of the circular disk plus the depth of the broken annular ridge.

2. The improvement of claim 1 wherein the circular disk rests upon the broken annular ridge such that a narrow annular aperture is formed between the exterior edge of the disk and the interior edge of said solid annular ridge to permit fluid flow through said aperture while the disk and solid annular ring inhibit plant roots from fouling the inlet port.

3. The improvement of claim 2 wherein the porous moisture sensor is connected to the fluid reservoir at a point above the level of the reservoir fill port to prevent backflow of fluid from reaching the sensor element.

4. The improvement of claim 3 wherein the interior of the fluid reservoir includes baffle means surrounding the fluid inlet port for inhibiting debris in the fluid from fouling the inlet port.

5. The improvement of claim 4 wherein the baffle means comprise a plurality of equally spaced radial fins about the inlet port, a raised nipple partially occluding the entry to the inlet port and a solid ring concentric about the inlet port on the upper interior surface of the fluid reservoir for restraining floating debris.

6. The improvement of claim 3 wherein the reservoir fill port is situated on an interior niche of the planter device such that overflow from the fill port drains into the interior of the planter.

* * * * *